(12) United States Patent
Cowan et al.

(10) Patent No.: US 12,157,420 B2
(45) Date of Patent: Dec. 3, 2024

(54) APPARATUS FOR MOVING AN ITEM

(71) Applicant: Clearview Property Management Pty Ltd, Craigieburn (AU)

(72) Inventors: Michael Cowan, Craigieburn (AU); Bernard Cincotta, Craigieburn (AU)

(73) Assignee: CLEARVIEW PROPERTY MANAGEMENT PTY LTD, Craigieburn (AU)

(*) Notice: Subject to any disclaimer, the term of this patent is extended or adjusted under 35 U.S.C. 154(b) by 291 days.

(21) Appl. No.: 17/319,565

(22) Filed: May 13, 2021

(65) Prior Publication Data

US 2021/0354633 A1 Nov. 18, 2021

(30) Foreign Application Priority Data

May 14, 2020 (AU) ................................ 2020901556

(51) Int. Cl.
*B66F 7/06* (2006.01)
*A47B 46/00* (2006.01)
(Continued)

(52) U.S. Cl.
CPC ............ *B60R 11/00* (2013.01); *A47B 46/005* (2013.01); *B66F 7/065* (2013.01); *A61G 3/062* (2013.01);
(Continued)

(58) Field of Classification Search
CPC .................. A47B 46/005; B60R 11/00; B60R 2011/0092; B60R 2011/0084;
(Continued)

(56) References Cited

U.S. PATENT DOCUMENTS 4,725,183 A * 2/1988 Smillie, III ............... B66F 3/12
187/244
4,958,979 A * 9/1990 Svensson ............... A61G 3/062
254/9 C
(Continued)

FOREIGN PATENT DOCUMENTS

AU 2013100281 B1 4/2013
AU 2013100281 B4 4/2013
(Continued)

OTHER PUBLICATIONS

Clearview (Why the Clearview Easy Slide™ is the best drop down fridge slide from Clearview Accessories Published on Aug. 28, 2017 at https://www.youtube.com/watch?v=IVK52xfoNTY&t=1s ) (Year: 2017).*

(Continued)

*Primary Examiner* — Mahdi H Nejad
(74) *Attorney, Agent, or Firm* — Muncy, Geissler, Olds & Lowe, P.C.

(57) ABSTRACT

Disclosed herein is an apparatus for moving an item. The apparatus comprises a mounting portion for mounting the apparatus to a surface, a platform configured to receive the item thereon, extendable arms configured to extend away from the mounting portion, wherein the platform is moveable between a storage position above the surface and an accessible position away from the surface, lifting assemblies that join opposing sides of the platform to a respective extendable arm, the lifting assemblies being configured to raise and lower the platform relative to the extendable arms whilst in the accessible position, and a driver operable to raise and lower the platform. At least one of the lifting assemblies comprises three arms, at least one arm being a driven arm that is driven by the driver whereby the platform is raised or lowered, and another are being a stabilising arm (Continued)

that is configured to move synchronously with the driven arm whereby the platform is stabilised.

19 Claims, 4 Drawing Sheets

(51) Int. Cl.
    *B60R 11/00*     (2006.01)
    *B66F 7/08*     (2006.01)
    *A61G 3/06*     (2006.01)
    *B60P 1/44*     (2006.01)

(52) U.S. Cl.
    CPC ..... *B60P 1/4442* (2013.01); *B60R 2011/0084* (2013.01); *B60R 2011/0092* (2013.01)

(58) Field of Classification Search
    CPC ............ B60R 2011/0036; B60P 1/4442; B66F 7/065; B66F 7/0608; B66F 7/08; B66F 7/28
    USPC .................................................. 254/122, 126
    See application file for complete search history.

(56) References Cited

U.S. PATENT DOCUMENTS

| | | | | | |
|---|---|---|---|---|---|
| 5,339,749 | A | * | 8/1994 | Hirose | ................. B23Q 1/5468 |
| | | | | | 108/143 |
| 6,109,395 | A | * | 8/2000 | Storm | ................... B66B 9/0869 |
| | | | | | 414/545 |
| 7,815,413 | B2 | * | 10/2010 | Fisher | .................... A61G 3/062 |
| | | | | | 414/812 |
| 10,898,395 | B2 | * | 1/2021 | Kline | ..................... A61G 3/062 |
| 2015/0003944 | A1 | * | 1/2015 | Eidsmore | .............. B60P 1/6409 |
| | | | | | 414/498 |
| 2016/0031354 | A1 | * | 2/2016 | Miles | ...................... A47B 51/00 |
| | | | | | 211/1.51 |
| 2016/0159264 | A1 | * | 6/2016 | Ochenkowski | ....... B60P 1/4442 |
| | | | | | 414/544 |
| 2017/0282775 | A1 | * | 10/2017 | Ochenkowski | ....... B60P 1/4442 |
| 2018/0222731 | A1 | * | 8/2018 | Cameron | ................ B66F 7/065 |
| 2018/0312381 | A1 | * | 11/2018 | Weinmeister | ............. B66F 7/28 |
| 2020/0282893 | A1 | * | 9/2020 | Weinmeister | ......... B60P 1/4442 |
| 2023/0255840 | A1 | * | 8/2023 | Dupuy | ..................... A61G 3/02 |
| | | | | | 414/495 |

FOREIGN PATENT DOCUMENTS

| | | |
|---|---|---|
| AU | 2016101849 A4 | 12/2016 |
| JP | 2001064000 A | 3/2001 |
| WO | WO 8803484 A1 * | 11/1987 |

OTHER PUBLICATIONS

The easiest way to have cold drinks and food at your fingertips with Clearview Power Slide; found at: https://www.youtube.com/watch?v=qSYXCFBrazY&t=1s (Year: 2023).*

The Power Slide Tested by All 4 Adventure; found at: https://www.youtube.com/watch?v=N-kBil9-VJ4&t=6s (Year: 2023).*

* cited by examiner

APPARATUS FOR MOVING AN ITEM

TECHNICAL FIELD

The present invention relates to an apparatus for moving an item between a storage position and an accessible position. In one particular form, the present invention relates to an apparatus having a platform on which an item such as a car fridge can sit, where the fridge is moveable from a relatively inaccessible position (e.g. inside the rear compartment of a vehicle) into a position where it can be more readily accessed (e.g. at least partially outside of the vehicle).

BACKGROUND ART

It can sometimes be difficult to access items when they are in storage. For example, the rear compartments of many vehicles are typically somewhat cramped (this is especially the case for the rear compartments of four wheel drive vehicles, for example) and items stored in such places therefore often need to be removed from the vehicle before they can be accessed. This is especially the case for items such as car fridges, tool boxes, etc., which often have a lid that opens by pivoting along an edge, where there may not be sufficient room in the rear compartment to fully open the lid. Similar issues may occur with items stored in ute canopies or in camper trailers.

It is known to mount heavy and/or bulky items such as car fridges to apparatuses that enable the items to be slid from their storage position (e.g. inside a vehicle) to a more accessible position (e.g. outside of the vehicle). Once in the accessible position, a number of variations of lifting/lowering assemblies can be used to either lift or lower the item into an even more accessible position (e.g. lowering of a car fridge from its relatively high position in the rear of a four wheel drive vehicle would enable a user to be able to lean over the fridge in order to more easily access its contents).

Using scissor arm mechanisms for such lifting and lowering operations can be especially useful because they enable a substantially vertical movement of the item. Other types of lifting mechanisms may involve some lateral movement of the item when it is raised or lowered, which may not be possible in tight spaces, or may present a risk to the operator, should lowering of the item become uncontrolled. Some scissor arm assemblies can, however, be susceptible to mechanical issues when used to lift/lower heavy or uneven weights.

Existing apparatus for making items such as car fridges more accessible to a user have generally been lifted and lowered by the operator using a manually actuated handle. However, given the weight of many items likely to be used with the assembly, such handles tend to have relatively long levers in order to provide a useful mechanical advantage and can therefore be unwieldy to house when not in use. Furthermore, some operators may struggle to lift and lower heavy loads, even with handles that make use of a significant mechanical advantage.

SUMMARY OF INVENTION

In a first aspect, the present invention provides an apparatus for moving an item. The apparatus comprises a mounting portion for mounting the apparatus to a surface, a platform configured to receive the item thereon, extendable arms configured to extend away from the mounting portion, wherein the platform is moveable between a storage position above the surface and an accessible position away from the surface, lifting assemblies that join opposing sides of the platform to a respective extendable arm, the lifting assemblies being configured to raise and lower the platform relative to the extendable arms whilst in the accessible position, and a driver operable to raise and lower the platform (i.e. relative to the slidable arms). At least one of the lifting assemblies comprises three arms, at least one arm being a driven arm that is driven by the driver whereby the platform is raised or lowered, and another arm being a stabilising arm that is configured to move synchronously with the driven arm whereby the platform is stabilised.

The present invention provides an apparatus for moving an item between a storage position (e.g. in the rear compartment of a four when drive vehicle) and an accessible position (e.g. projecting outwardly from the rear of the vehicle, where a user can stand adjacent to the item and easily access its contents). Once in the accessible position, the item can be raised and/or lowered (e.g. to a height at which the user can more easily access its contents). The unique lifting assemblies in the present invention provide a degree of support to and stabilisation of the platform and the extendable arms that is not achievable by prior art lifting apparatus, and especially those that utilise scissor arms for the lifting and lowering mechanism. The unique configuration of the lifting assemblies has also obviated the need for a bulky and unwieldy manually operated handle, enabling the drivers such as the compact drivers described below in the context of preferred embodiments of the invention to be used in order to automatically actuate lifting and lowering of the platform/item.

In some embodiments, the apparatus may comprise two lifting assemblies that join opposing sides of the platform to respective extendable arms. In such embodiments, each lifting assembly comprises three arms, at least one of which is a driven arm that is driven by the driver whereby the platform is raised or lowered, and another of which is a stabilising arm that is configured to move synchronously with the driven arm whereby the platform is stabilised. In such embodiments, the lifting assemblies on either side of the platform may be the same, enabling an even more controlled lifting/lowering action and enhanced platform stability.

In some embodiments, a proximal end of the stabilising arm may be configured to slide along the extendable arm (e.g. along a slot provided in the arms) as the platform is raised and lowered. The proximal end of the stabilising arm may, for example, be configured to slide along the extendable arm in a direction towards the mounting portion (and hence towards the surface to which the mounting portion/assembly is mounted) as the platform is raised. In this manner, an end of the stabilising arm slides towards the surface from which the extendable arms project, thereby reducing at least some of the torque forces being experienced by the assembly (i.e. about the edge of the surface from which it projects), whilst also distributing the weight of the platform/item across a wider portion of the extendable arm. Both of these features improve the stability to the platform (and the assembly in general), especially in respect of any torsional forces being experienced between the platform and the extendable arms.

In some embodiments, in order to even further stabilise the platform with respect to the extendable arms, the stabilising arm and one of the other arms in the lifting assembly may be pivotally connected intermediate their ends, thereby defining a scissor arm assembly.

In some embodiments, two of the arms in the lifting assembly may be driven by the driver. Such a configuration would be more likely to evenly distribute the load caused during lifting and lowering of the platform (and item thereon) across multiple elements of the apparatus. In some of such embodiments, a lifting assembly may be provided having opposing driven arms, with the stabilising arm defining a scissor arm assembly with one of the driven arms, and with all arms moving synchronously as the platform is raised and lowered. Such embodiments will be described in further detail below and advantageously provide a degree of stability to the platform, even when heavily loaded, which the inventors believe is simply not achievable by existing fridge slides.

In some embodiments, distal ends of the driven arms may be configured to slide along the side of the platform as it is raised and lowered. In some of such embodiments, the driven arms may be pivotally fixed to the extendable arms at a pivot intermediate their proximal and distal ends. In some of such embodiments, the driver may be attached to proximal ends of the driven arms. In some embodiments, the driven arms may be curved such that their proximal ends are orientated towards the driver, resulting in the driver being in an efficient alignment with the distal ends of the opposing driven arms. Such a configuration may also reduce the distance between the driven arms' proximal ends and enable smaller drivers to be used. In some embodiments, the driven arms may be curved at the pivot.

In some embodiments, the driver may be a linear actuator. Typically, the driver is electrically actuated, although manually actuated drivers may be advantageous in some circumstances.

The configuration of other components of the apparatus may be similar to those of existing apparatus designed for similar purposes. In some embodiments, for example, the mounting portion may comprise one or more members configured to abut the surface and be attached thereto.

In some embodiments, the extendable arms may comprise one or more telescopic arms, such configurations being used in some existing fridge slides and in drawer systems. In such embodiments, a housing of the one or more telescopic arms may be configured to be attached to the mounting portion. The extendable arms may, for example, comprise inner, intermediate and outer telescopic arms and, in some embodiments, the proximal ends of the arms of the lifting assemblies may be joined to the inner telescopic arms (i.e. the ones that projects out the furthest).

Typically, the apparatus comprises two extendable arms and the platform is configured to be positioned therebetween, although it will be appreciated that alternative structures (such as those described below) may also be provided.

In some embodiments, a width and/or length of the platform may be adjustable. Such features may enable a shape of the platform to be configurable such that it substantially matches a footprint of the item. The platform of the apparatus of such embodiments of the present invention may advantageously be adjusted to accommodate a variety of different sized items thereon. As such, the same apparatus may be used with a number of different items, thereby increasing its usefulness, both for individuals and retailers.

In some embodiments, the assembly may further comprise a further driver operable to drive the platform between the storage and accessible positions. In such embodiments, both movements of the platform/item would be automated, meaning that all a user may need to do to deploy the apparatus would be to press a button. Whilst a lateral (and typically substantially horizontal) movement is unlikely to be as physically taxing as a vertical movement, complete automation of a fridge slide (for example) may be a highly desirable feature for some customers.

The apparatus of the present invention may also be provided in kit form, for assembly by a user after purchase. Accordingly, in a second aspect, the present invention provides a kit of parts which, when assembled is the apparatus of the first aspect of the present invention.

BRIEF DESCRIPTION OF DRAWINGS

Embodiments of the present invention will be described in further detail below with reference to the following drawings, in which.

DESCRIPTION OF EMBODIMENTS

Figure 1:
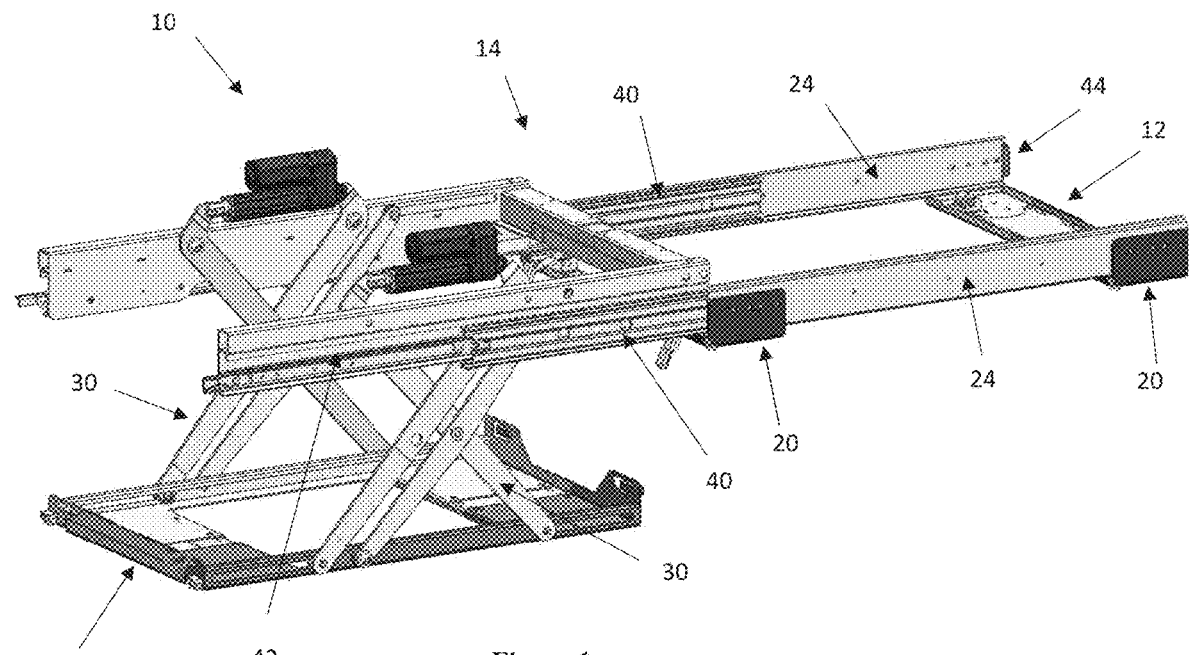
FIG. 1 shows a perspective view of an apparatus for moving an item in accordance with an embodiment of the present invention in an extended (accessible) configuration and with its platform in its lowered position.

As noted above, the present invention provides an apparatus for moving an item. The apparatus comprises a mounting portion for mounting the apparatus to a surface, a platform configured to receive the item thereon, extendable arms configured to extend away from the mounting portion, wherein the platform in moveable between a storage position above the surface and an accessible position away from the surface, lifting assemblies that join opposing sides of the platform to a respective extendable arm, the lifting assemblies being configured to raise and lower the platform relative to the extendable arms whilst in the accessible position, and a driver operable to raise and lower the platform relative to the slidable arms. One or more of the lifting assemblies comprise three arms, at least one of which is a driven arm that is driven by the driver whereby the platform is raised or lowered, and another of which is a stabilising arm that is configured to move synchronously with the driven arm whereby the platform is stabilised.

The apparatus of the present invention is operable to move an item on or in the platform from a stowed or storage position to a position where it is able to be accessed by a user (or is more easily accessible by the user). The apparatus is generally suitable for use with any item which could reasonably be expected to be stored on such a tray, including items such as car fridges, tool boxes, storage containers, generators, battery systems, portable gas cooktops, kitchen modules, etc.

The apparatus of the present invention is primarily intended for use in vehicles such as tradesperson's vehicles, station wagons, four wheel drives, utes, caravans, camper trailers, and the like, and will be described herein primarily in this context. However, it will be appreciated that the apparatus may also find application in domestic situations, such as in storage or shelving systems.

In the context of the present invention, it is to be understood that the terms "distal" and "proximal" are relative terms, but which are used for convenience to refer to the ends of the respective arms in the lifting assembly located at the platform and extendable arms, respectively.

Similarly, in the context of the present invention, it is to be understood that the terms front, forwards, rear and rearwards (and the like) are used for convenience to refer to opposing sides of the platform/apparatus in use.

In a specific form, for example, the apparatus may be mounted inside the rear compartment of a four wheel drive vehicle, either to the floor of the compartment or to the top of a drawer system of the kind often found in the rear compartments of such vehicles. In another specific form, for example, the apparatus may be used to slide a car fridge or a portable gas cooktop from the side of a camper trailer. In another specific form, for example, the apparatus may be used to improve access to containers stored in household situations, such as under beds, in shelving systems, and the like.

The apparatus of the present invention may be mounted to any suitable surface. Typically, the surface will be a metallic surface, such as those commonly found in vehicles (e.g. a ute canopy, the floor of a rear compartment of a station wagon or a four wheel drive vehicle, etc.). However, the apparatus could also be attached to surfaces such as plastic surfaces or wooden surfaces. Typically, the surface is a substantially flat surface, however, the apparatus may also be mountable to uneven surfaces or surfaces which have undulations over them.

The apparatus comprises a mounting portion for mounting the apparatus to a surface. The mounting portion may have any form and structure that enables the apparatus to be mounted to a surface such that the platform (as well as any item on the platform) is able to be moved between its storage and accessible positions.

The mounting portion may be mounted to the surface in any manner that is strong enough to withstand the forces that would be expected to occur when the item on the platform (e.g. a car fridge laden with food and/or drinks) is furthest away from the mounting portion (typically, this is when it is in the accessible position), with an appropriate safety margin. In some embodiments, for example, the mounting portion may be provided in the form of (or include) one or more members configured to abut the surface and be attached thereto. Each such member may, for example, include one or more apertures configured to align with apertures in the surface and receive attachment means (e.g. fasteners such as nuts and bolts or screws, etc.) therethrough. Alternatively, each member may held in place on the surface by being received under a bracket (or the like) which is itself attached (or integral) to the surface.

The mounting portion may for example, be provided by one or more elongate members (e.g. an elongate rail or an elongate plate). The elongate members may be configured to be orientated laterally or longitudinally with respect to the apparatus and the direction of lateral movement of its platform. Each of such elongate members may have a number of apertures through which bolts or other fasteners can be passed in order to fasten the mounting portion (and hence the apparatus) to the surface.

The mounting portion may also be configured to be attached to other components of the apparatus. For example, in some embodiments (described in further detail below), the mounting portion is configured to be attached to the housing for telescopic arms that are attached to the platform and which enable it to slidably move between its storage and accessible positions. In some embodiments, such housings may themselves be provided with apertures or brackets which can be used to mount the housings to the surface (e.g. the housings themselves comprise the mounting portion).

The mounting portion may be provided as a single unit, or as components that are assemblable (e.g. by bolting or otherwise joining together) to form the mounting portion.

The apparatus also comprises a platform (also referred to below as a tray) that is moveable with respect to the mounting portion in the manner described below.

The platform itself may have any form and structure that is capable of receiving an item (e.g. car fridge, tool box, storage box, etc.) thereon. The platform may, for example, have an item receiving surface provided by a substantially planer sheet of material. The item receiving surface may span the entire footprint of the item for receipt thereon, or only part thereof (e.g. around the edges or corners of the footprint or corresponding to the position of supports on the underside of the item). The platform may, for example, have raised edges (either completely around the periphery of the platform or just at the front and back). The platform may, for example, be provided by a number of members which together define a surface (e.g. a substantially planer surface) for receiving the item. The platform may, for example, be provided in the form of extruded L-channel that extends around a periphery of the tray, optionally with one or more cross members for additional strength and/or upon which an underside of the item may sit.

For ease of construction and more general applicability, the platform is typically generally square or rectangular shaped (possibly with rounded edges), although other shapes of platforms may suit more specific applications.

The item may simply sit on the platform with its weight holding it in position (especially when the platform has raised edges around its periphery). However, more typically (and especially if the apparatus is for use in a vehicle), the platform (or elsewhere on the apparatus) may include features that enable securing means to be used to more securely hold the item on the platform. Securing means may, for example, be provided in the form of permanently attached straps or other locking means, or provided in the form of apertures on the platform (or an associated component of the apparatus) through which the ends of straps stretching over the item can be received.

In some embodiments, one or more dimensions of the platform may be adjustable such that the item is receivable thereon. In this manner, the apparatus may be used with a wide variety of different items having a variety of different shapes (or the same item in different configurations, such as lengthways or sideways), providing the numerous advantages described herein. In some embodiments, a width of the tray is adjustable. In some embodiments, a length of the tray is adjustable. In some embodiments, both the length and the width of the tray are adjustable. In some embodiments, a shape of the tray is configurable to substantially match a footprint of the item.

As noted above, the platform of the apparatus of such embodiments of the present invention may advantageously be adjusted to accommodate a variety of different sized items thereon. As such, the same apparatus may be used with a number of different items, thereby increasing its usefulness, both for individuals and retailers. For example, an individual user may want to upgrade their car fridge (for example) after a few years and, even if their new fridge was a different size (which would be likely), it would not be necessary to replace the apparatus as well. Retailers may, for example, only need to stock one such apparatus (i.e. of the present invention) to accompany the majority of car fridges (for example) that they sell, thus simplifying their product line. Platforms having such functionality are described in detail in Australian innovation patent no. 2016101849, the contents of which are incorporated herein in their entirety.

The apparatus also includes extendable arms that are configured to extend away from the mounting portion (e.g. outwardly from the rear compartment of a 4WD vehicle) and which are operable to enable the platform to be moved with respect to the mounting portion. In this manner, an item situated on the platform can be moved (e.g. slid) from a storage position above the surface to which the mounting portion is affixed (e.g. inside a rear compartment of the vehicle) to a more accessible position away from the surface (e.g. projecting outwardly from and overhanging the rear of the vehicle).

Locking means may also be provided to lock the platform in at least its storage and/or accessible positions (e.g. so it cannot move between the storage and accessible positions whilst locked). Suitable locking means are known in the art.

Typically, the apparatus comprises two extendable arms which receive the platform therebetween, as this configuration maximises strength whilst minimising space. It is to be appreciated, however that the apparatus may, in some embodiments, have only one extendable arm, or may have three or more extendable arms. For example, in one embodiment, the apparatus may include two or more platforms that are positioned side by side and collectively or independently moveable between storage and access positions. Such an embodiment would require at least three extendable arms. Typically, each extendable arm in the apparatus will have a corresponding lifting assembly joined thereto. In some embodiments however, an extendable arm in the apparatus may have no lifting assembly or may have two lifting assemblies joined thereto (e.g. the central extendable arm in the two platform apparatus described above).

In some embodiments, the extendable arms may be provided in the form of telescopic arms that connect the platform to the mounting portion (i.e. the telescopic arms slidably join the mounting portion and the platform). Typically, the extendable arms comprise inner, intermediate and outer telescopic arms, with the proximal ends of the arms of the lifting assemblies typically being joined to the innermost telescopic arms (i.e. the arm which projects farthest away from the mounting portion/surface).

As noted above, in some embodiments, the housing of the telescopic arm(s) may be configured to be attached to the mounting portion. In some embodiments, however, the mounting portion may be provided on or by a housing of the telescopic arms. For example, the housing of the telescopic arms may be provided with a number of apertures configured to be aligned with corresponding apertures on the surface and receive fasteners therethrough. Alternatively (or in addition), brackets may be integrally provided on, or attachable to, the housing (e.g. on an outer edge thereof), with the brackets having apertures for alignments with apertures in the surface and configured to receive fasteners therethrough.

Telescopic arms suitable for slidably connecting the platform to the mounting portion are known, and typically include rails adapted to slidably receive thereat slidable arms. Such rails may have any structure that securely retains the slidable arms to the rails, but without unduly restricting the sliding action, even w % ben a heavy item is being slid. Telescopic arms having different lengths, weight ratings and bearing systems may be provided for use with the apparatus of the present invention. For example, telescopic arms having runners between about 700 mm (e.g. for smaller car fridges) and about 1800 mm (e.g. for larger toolboxes for the rear trays of utes) could be used. Commercially available runners are, for example, available from Hafele in lengths of between about 400 mm and about 1,500 mm.

Apparatus for moving items having similar mounting portions, platforms and extendable arms are disclosed in Australian innovation patent no. 2013100281, the contents of which are incorporated herein in their entirety.

The apparatus of the present invention also includes a novel lifting assembly that joins the platform to the extendable arms in a manner whereby the platform can be raised and lowered relative to the slidable arms (i.e. whilst in the accessible position). At least one of the lifting assemblies comprises three arms, at least one of which is a driven arm that can be driven by the driver in order to raise and lower the platform, and another of which is a stabilising arm that moves synchronously with the driven arm and stabilises the platform.

Typically, each lifting assembly in the apparatus would have the same structure (i.e. as described below), with the attendant advantages described herein. It will be appreciated, however, that some embodiments of the apparatus of the present invention may include lifting assemblies having different configurations.

The unique lifting assembly in the present invention provides a degree of support to and stabilisation of the platform and extendable arms that is not achievable by prior art lifting apparatus, and especially for those including scissor arms. The platforms of prior art lifting apparatus can, for example, tend to wobble or become non-level in certain vertical positions, and especially if being deployed form a surface that is not completely horizontal (e.g. if the vehicle is parked on a hill) and whilst carrying a heavy item. Fore and aft movement of the platform may also be an issue with uneven loads on the platform. Such movement of the platform can cause undue wear and tear on the apparatus and necessitate that extremely robust (and therefore generally either heavy or expensive) materials be used.

The stabilising arm in the lifting apparatus of the present invention substantially prevents such wobbling or other instability of the platform. The stabilising arm may, in some embodiments, also enable the weight carried on the platform to be distributed across three arms, rather than just two, meaning that heavier items can possibly be carried and/or that lifting assemblies can have configurations that are compatible with an automatic actuation. Further, the unique lifting arm configuration described below in the context of preferred embodiments of the invention has enabled compact drivers to be used in order to automatically actuate lifting and lowering of the platform/item.

The lifting assembly may have any configuration where at least one of the three arms is drivable by the driver to effect a raising and lowering movement of the platform, and where another of the arms functions to stabilise the platform. Examples of specific configurations will be described in further detail below, and it is within the ability of a person skilled in the art to develop alternative configurations that embody the present invention.

Depending on the configuration of the lifting assembly, ends of the arms of the lifting assembly may be pivotally fixed to the platform/extendable arms, where the end of the arm is at a fixed location on the platform/extendable arms, about which it can pivot. Alternatively, the ends of the arms may be slidable relative to the platform/extendable arms, where the end of the arm has a limited freedom of movement to slide with respect to the platform/slidable arms. For example, a slot may be provided in a wall of the platform/extendable arms, along which a roller at the end of the arm can slide.

In embodiments where the lifting assembly includes a scissor arm configuration (described in further detail below), one end of each arm would typically be pivotally fixed to the platform/extendable arms and the other end slidable relative to the other of the platform/extendable arms.

In specific embodiments, for example, a proximal end of the stabilising arm may be configured to slide along the extendable arms as the platform is raised and lowered. In this manner, the distribution of weight carried by the arms of the lifting assembly to the extendable arms changes as the platform is lifted and lowered, which can beneficially reduce the load being experienced by other components of the assembly.

The proximal end of the stabilising arm may, for example, be configured to pivotally slide along the extendable arms in a direction towards the mounting portion as the platform is raised. In this manner, an end of the stabilising arm slides towards the surface from which the extendable arms project, thereby lessening at least some of the forces being experienced by the assembly about the edge of the surface from which it projects. This movement also distributes the weight of the platform/item across a wider portion of the extendable arm (as noted above). Both of these features provide an enhanced stability to the platform (and the apparatus in general), and especially in respect of any torsional forces between the platform and the extendable arms. Typically, in such embodiments, the distal end of the support arm will be pivotally fixed to the platform.

In some embodiments, in order to even further stabilise the platform with respect to the extendable arms, the stabilising arm and one of the other arms in the lifting assembly may be pivotally connected intermediate their ends. Such a configuration results in the lifting assembly including a scissor arm assembly, with its attendant benefits, including a substantially vertical lifting movement. Such a configuration would also provide an even greater resistance to any torsional movement that might be induced by operation of the lifting mechanism (especially with a heavy or uneven load).

Generally, two of the arms in the lifting assembly would be configured to be driven by the driver. Such a configuration would more evenly distribute the load caused during lifting and lowering of the platform/item across the assembly. Any configuration of driven arms that can achieve a lifting and lowering action of the platform with respect to the extendable arms may be used.

In one configuration, for example, the distal ends of the driven arms may be configured to slide along the side of the platform as the platform is raised and lowered. In some of such configurations (e.g. where the arms are substantially linear and cross over between the extendable arms and platform), the driven arms may be pivotally fixed to the extendable arms at a pivot intermediate their proximal and distal ends. In some of such embodiments, the driver may be attached to the proximal ends of the driven arms. In this manner, the driver may take advantage of a lever action, the effect of which is dependent on the relative distances between the driven arms' proximal/distal ends and the pivot on the extendable arms.

In some embodiments, the driven arms may include a curve such that their proximal ends are orientated towards the driver (and each other). Such a configuration results in the driver being in an efficient alignment with the distal ends of the opposing driven arms. In effect, the driver and the driven arms' proximal ends are all in aligned in the same plane. As will be described below in the context of a specific embodiment of the apparatus, such a configuration can enable the driver to be conveniently and safely located in a position above the extendable arms, where it remains substantially motionless whilst being operated to raise and lower the platform, and with all forces being substantially in-line so as not to introduce torsional forces into the system. Such a configuration may also reduce the distance between the driven arms' proximal ends and enable smaller drivers to be used.

The apparatus of the present invention also includes a driver operable to raise and lower the platform relative to the extendable arms. Any driver that is capable of achieving this functionality may be used, bearing in mind the intended applications of the apparatus.

In some embodiments, the driver may be a linear actuator. The linear actuator may be operated using any suitable mechanism, some of which include screw threads or hydraulic power. Typically, the driver will be automatically actuated, although manual drivers may be advantageous in some circumstances.

In some embodiments, for example, a remote control may be provided with the apparatus, with a raise/lower button (not dissimilar to a garage door remote control). Alternatively, a button may be provided on an accessible part of the apparatus itself which, when pressed, caused the platform to raise and/or lower. Appropriate safeguards would, of course, be provided in order to ensure that an accidental pressing of the button did not have undesired consequences.

In some embodiments, a controller may also be provided for controlling two or more drivers so that they cause both sides of the platform (or multiple platforms, etc.) to raise and lower at exactly the same time and rate.

The kit of the present invention may include any of the components described above in an unassembled (or partially assembled) form, and may also include items such as instructions for assembling the apparatus and specific tools for doing so (e.g. appropriately sized Allen keys and/or spanners). As discussed below (in the context of a specific embodiment), a number of the parts of the apparatus may be identical in order to reduce the total number of parts required to assemble the apparatus. As will be appreciated, fewer parts may reduce the cost of manufacture.

Any suitable materials can used to form the components of the apparatus of the present invention. Typically, as the apparatus is likely to be subject to constant vibrations and repeated use, the components will be formed from durable but light weight metallic materials such as mild steel, galvanised steel or aluminium. Extra heavy duty ball bearing runners supplied by Hafele, for example, are zinc plated steel. However, to save weight, certain components (especially non weight bearing components) could be made from plastic materials or timber.

A specific embodiment of the present invention will be described below with reference to the accompanying Figures.

Referring firstly to FIGS. 1 to 4, an apparatus for moving an item (such as a car fridge, not shown) between an accessible position (FIG. 1) and a stored or stowed position (FIG. 3) in the back of a four wheel drive vehicle (not shown), for example, is shown in the form of slide 10. Slide 10 has a mounting portion in the form of cross-members 12, 12, a sliding mechanism in the form of telescopic arms 14, 14 and a platform in the form of tray 16, each of which will be described in further detail below.

Each cross-member 12, 12 has a generally planar base, with apertures shown generally at 18 located proximal to telescopic arms 14, 14 for affixing the cross-members 12, 12 (and thus the slide 10) to a generally planar surface (not shown). Each aperture 18 can be aligned with a respective aperture provided in the surface (not shown) to which the respective cross-member 12 is to be affixed, and fasteners such as bolts and nuts (not shown), used to secure the cross-member to the surface.

Each cross-member 12 also has return portions shown generally at 20 at its distal ends for securely attaching the cross members 12, 12 to the distal ends (front and rear, in use) of outer housings 24, 24 of the telescopic arms 14, 14. Each return portion 20 has apertures shown generally at 26, which align with apertures shown generally at 28 in the housing 24 and via which fasteners such as bolts (not shown) may be passed. In this manner, cross members 12, 12 provide a secure mounting for the telescopic arms 14, 14 and hence the slide 10 to the surface.

Figure 2:
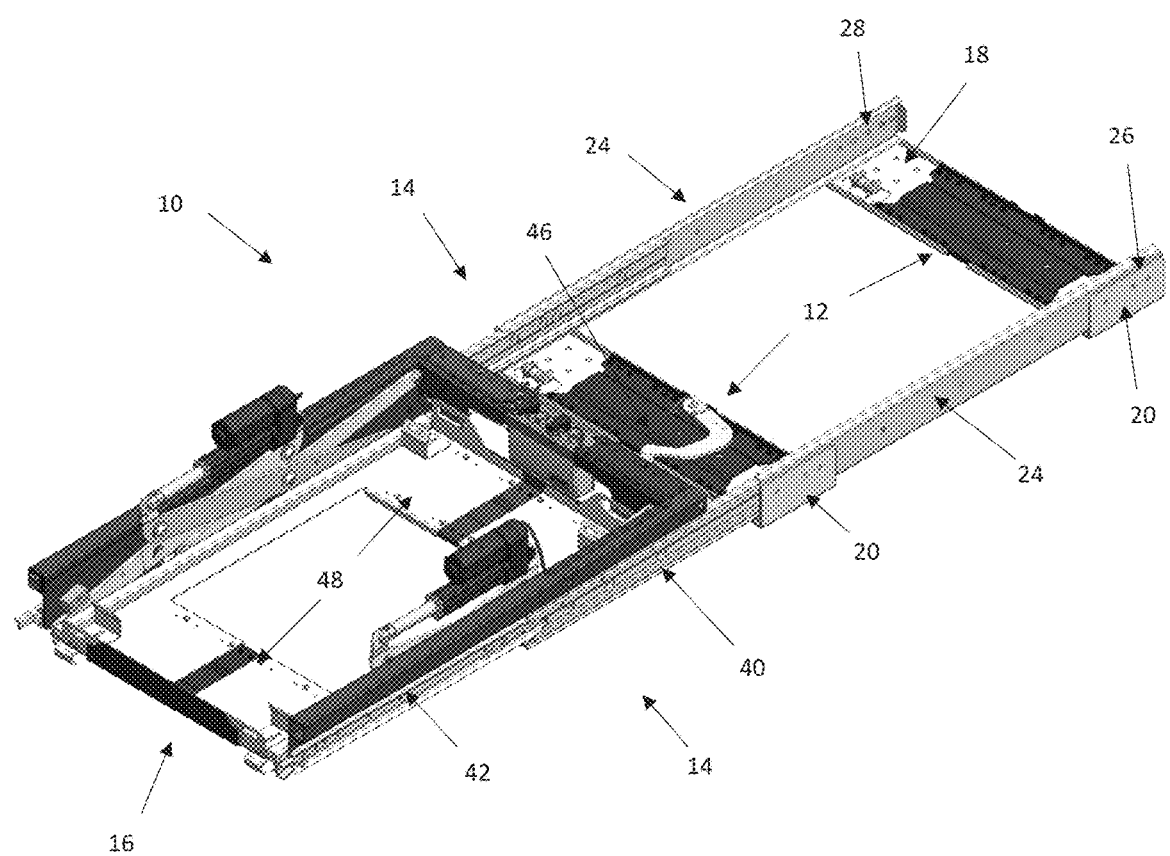
FIG. 2 shows a perspective view of the apparatus of FIG. 1, with the platform in its raised position.
Figure 3:
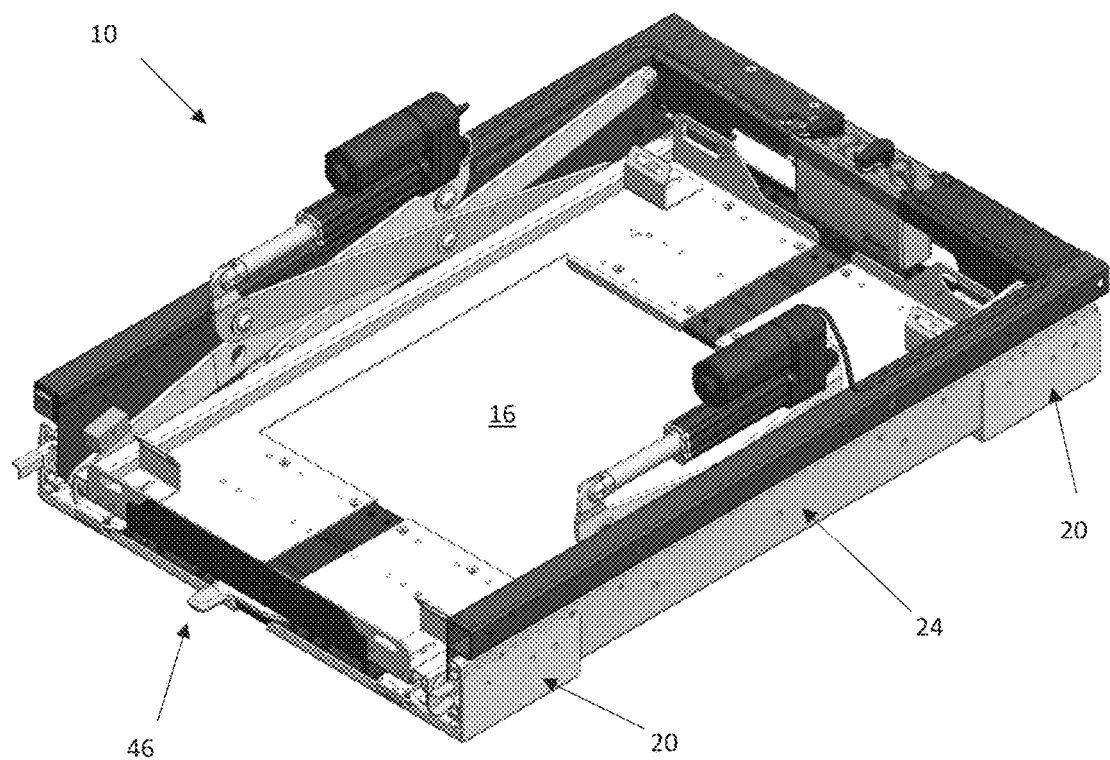
FIG. 3 shows a perspective view of the apparatus of FIG. 1, with the platform in its storage configuration.
Figure 4:
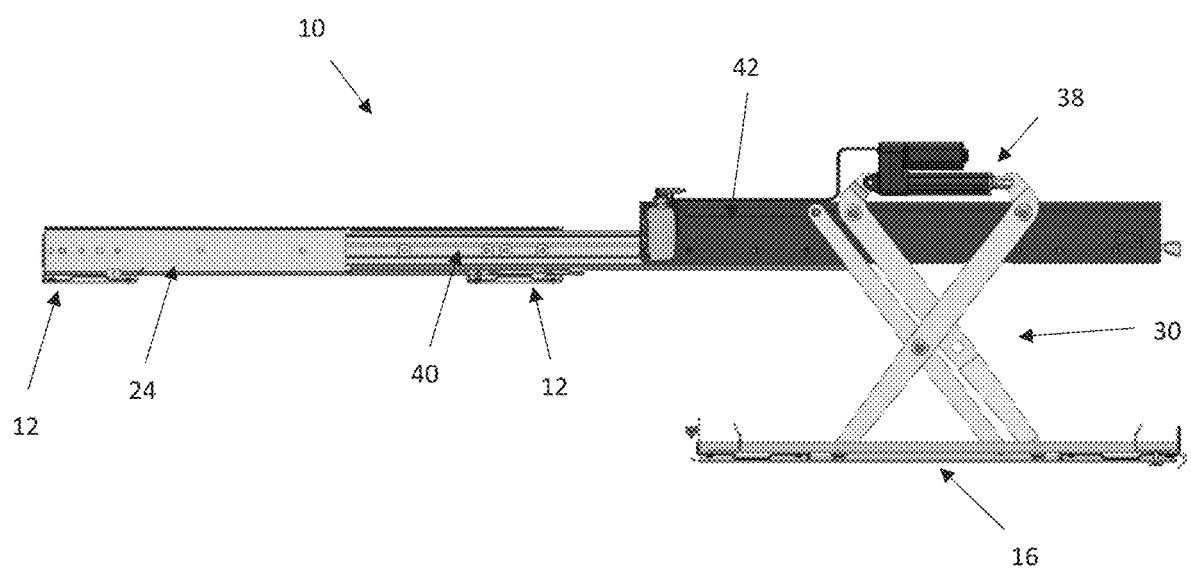
FIG. 4 shows a side cutaway view of the apparatus of FIG. 1, with the platform in its lowered position and with one of its lifting arm assemblies clearly visible.

Telescopic arms 14, 14 are of the kind known in the art and are commercially available in a variety of sizes and a range of tolerances. In brief, each telescopic arm 14 has self-contained, telescopic, ball bearing slides (not shown in detail) of the type commonly used in applications where components are required to slide with respect to each other. Telescopic movement occurs in stages, with the first telescopic arm 40 initially sliding fully out of housing 24, after which the second telescopic arm 42 is engaged and then also slides out of arm 40 until arm 42 (and hence tray 16) reaches the end of its travel (as shown in FIGS. 1 and 2). Tray 16 is held between the second telescopic arms 42, 42, and joined thereto in the manner described below. In this manner, tray 16 is capable of being slid up to 100% of its length (or even more using extended runners) such that it can be moved towards a more accessible position (e.g. outside of the rear compartment of a four wheel drive vehicle, where the lid of a fridge thereon can be completely opened and its contents more easily accessed).

Each housing 24 has a tab 44 at one end thereof (see FIG. 1). Tab 44 prevents tray 16 from sliding too far back when slid back into its stowed position by acting as a stop for the innermost ends of arms 42 and 40. Typically, locking means are provided to lock the tray 16 in at least its storage position (e.g. so it cannot slide whilst in the rear compartment of a vehicle). Such locking means are known in the art and are typically incorporated into the telescopic arms 14. Slide 10, for example, incorporates a latch 46 (see FIGS. 2 and 3) that is operable to prevent the arms 40 and 42 of the telescopic arms 14 from moving.

Figure 5:
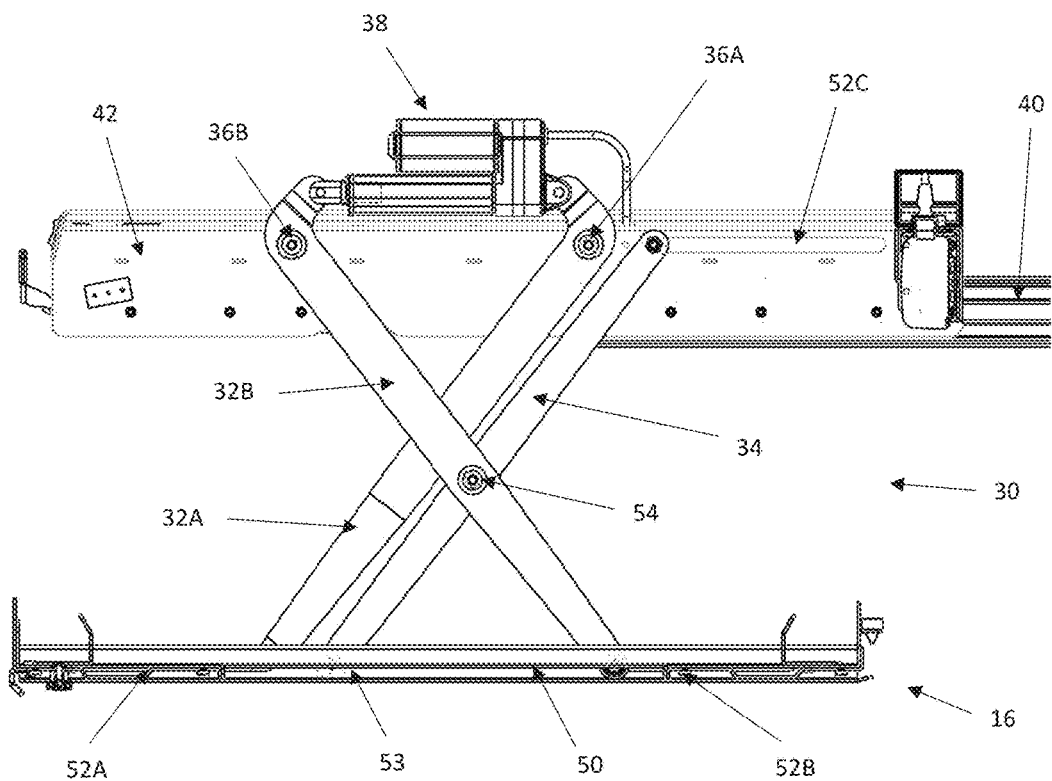
FIG. 5 shows a side cutaway view of a portion of the apparatus of FIG. 1, with the platform in its lowered position and with one of its lifting arm assemblies clearly visible.

Tray 16 has a base 48 that is substantially rectangularly shaped with upturned edges around its periphery. Base 48 can securely retain an item within the tray 16 during storage and access. Tray 16 may also have features that enable an item on the tray to be more securely retained on the tray. For example, the tray 16 (e.g. an edge thereof) may have apertures which enable webbing tie downs to be affixed to the tray and around a fridge sitting on the tray (not shown). The upturned edges along the sides of the tray 16 define side walls 50, 50, each of which includes slots 52A and 52B and pivot 53 (see FIG. 5).

The width of tray 16 can vary from about 380 mm to about 540 mm (the width of the slide 10 correspondingly being between about 428 mm to about 588 mm), although it is to be understood that such widths are indicative only and apparatuses in accordance with the present invention may have widths less than 380 mm or more than 540 mm (e.g. when, as discussed above, the item is intended to be held in a sideways configuration, the width of the tray may be around 900 mm). As noted above, tray 16 may be provided having a variable width, as described in detail in the applicant's Australian innovation patent no. 2016101849.

The length of tray 16 can vary from about 680 mm to about 880 mm), although it is to be understood that such lengths are indicative only and apparatuses in accordance with the present invention may have widths less than 680 mm or more than 880 mm (e.g. when, as discussed above, the item is intended to be held in a sideways configuration, the length of the tray may be around 500 mm). Similar to that described above, tray 16 may be provided having a variable length, as described in detail in the applicant's Australian innovation patent no. 2016101849. A shape of the tray 16 would therefore be configurable to substantially match a footprint of any given item.

Figure 6:
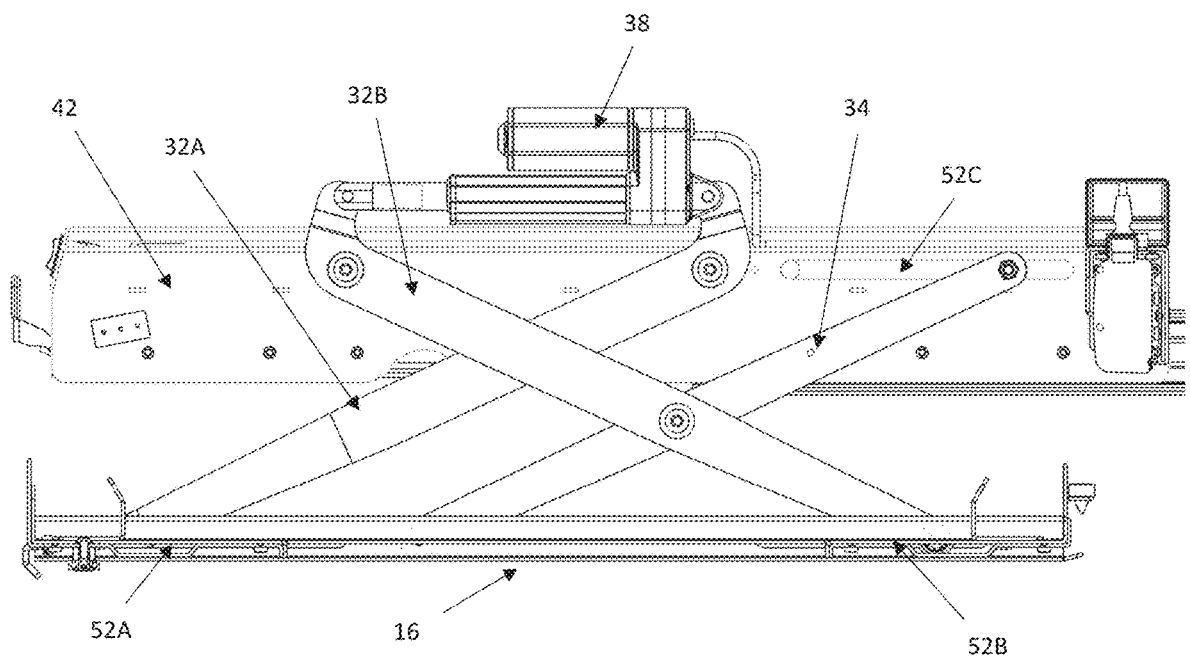
FIG. 6 shows a side cutaway view of the same portion of the apparatus as FIG. 5, but with the platform in a partially raised position.
Figure 7:
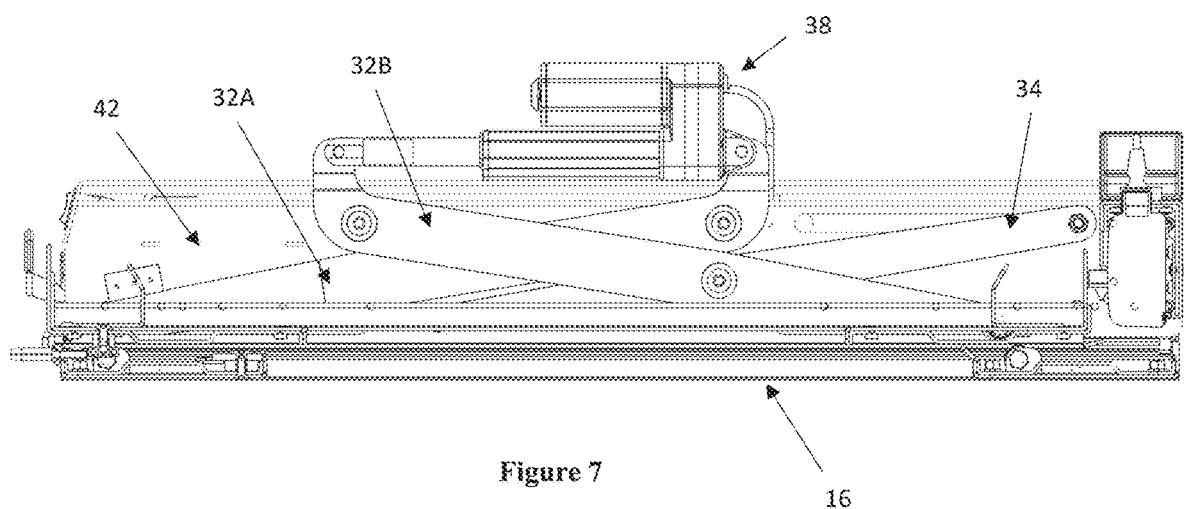
FIG. 7 shows a side cutaway view of the same portion of the apparatus as FIG. 5, but with the platform in a completely raised position.

Tray 16 is joined to second telescopic arms 42, 42 of the telescopic arm assembly 12 via lifting assemblies 30, 30, shown in the form of opposing synchronous lifting arms with a levelling and stabilising scissor arm assembly. As lifting assemblies 30, 30 have essentially the same structure, only one will be described in further detail below and with reference to FIGS. 5 to 7. As can most clearly be seen in FIG. 5, lifting assembly 30 has two driven arms 32A and 32B and a stabilising/support arm 34. The distal ends of driven arms 32A and 32B are slidably connected to the tray 16 via rollers which are captured in slots 52A and 52B provided in the side wall 50. The rollers (not numbered) securely retain the distal ends of each driven arm 32A, 32B to the side wall 50, but enable the arms' distal ends to slide along the length of the slot 52A, 52B, such that the driven arms can pivot between the configurations shown in FIGS. 5, 6 and 7. The rollers may, for example, be provided in the form of ball races coated in polyurethane, which are especially suitable for running back and forth in metal slots.

The driven arms 32A and 32B are pivotally fixed to each second telescopic arm 42 at pivots 36A and 36B and to a driver in the form of electrically actuated linear actuator 38 at their proximal ends. The driven arms 32A and 32B are curved about the pivots 36A and 36B, whereby they present to the actuator 38 in a more closely spaced manner and in an in-plane alignment that enables a relatively small actuator to be used and to remain in a relatively stationary position with respect to the apparatus 10 during its operation (as described below). This in-plane alignment also tends to reduce or even eliminate any torsional forces that the driven arms 32A and 32B (and other components of the apparatus 10) might otherwise be subjected to in use.

Operation of actuator 38 to force the proximal ends of arms 32A and 32B apart causes their distal ends to slide outwardly (i.e. away from each other) in slots 52A and 52B and the scissor arm assembly to close up, resulting in the tray 16 moving in an upwards direction (relative to the telescopic arms 14). Similarly, operating the actuator 38 to draw the proximal ends of arms 32A and 32B together causes their distal ends to slide inwardly (i.e. towards each other) in slots 52A and 52B and the scissor arm assembly to open out, resulting in the tray 16 moving in a downwards direction. As both of driven arms 32A and 32B are driven, the load on the tray 16 tends to be evenly distributed across the assembly. In contrast, many existing fridge slides are actuated by a user driving only one arm of the lifting assembly, which can result in instabilities of the kind described above.

The distance between pivot 36 and the proximal end of each driven arm 32 is less than the distance between pivot 36 and the distal end, hence a mechanical advantage is afforded and a relatively small movement of the proximal ends corresponds to a relatively large movement at the distal ends. In the embodiment depicted, the actuator 38 has sufficient power to be able to raise and lower even relatively heavy loads with this mechanical advantage.

Scissor arm assemblies can sometimes be susceptible to torsional instabilities, especially when in an extended configuration, because the mechanical requirements of the assembly may necessitate that one or both of the scissor arms include bends or be unevenly loaded. Furthermore, an uneven weight distribution on a tray might also result in one of the arms of a scissor assembly taking a greater proportion of the load than the other, which may cause the tray to tilt or otherwise become unstable. In the lifting assembly 30, however, a third arm is provided for additional support and stability. In the embodiment shown, such a stabilising arm is provided in the form of support arm 34. Support arm 34 is positioned adjacent and parallel to driven arm 32A but moves in a different manner when the actuator 38 is actuated. Support arm 34 is pivotally fixed at its distal end to the side wall 50 of tray 16 at a position intermediate slots 52A and 52B (closer to slot 52A, in this embodiment). The proximal end of support arm 34 is received in a slot 52C in the second telescopic arm 42, where it can slide in a manner similar to that described above in the context of drive arms 32A, 32 B and slots 52A, 52B (i.e. with the assistance of a roller, as described above). Support arm 34 is also pivotally connected to driven arm 32B at a point intermediate each arms' ends. This pivoting connection between arms 32B and 34 adds a good deal of stability to the lifting arm assembly 30 and tray 16.

Furthermore, as the actuator 38 drives the proximal ends of the driven arms 32A, 32B apart (and hence lifts the tray 16) the three points of contact on both the arm 42 and the tray's sidewall 50 spread outwardly as the tray rises. In this manner, the lifting force is spread more evenly across these components than would be the case with a conventional scissor assembly (and becomes even more so as the tray lifts). Further, as the proximal end of support arm 34 slides towards the mounting portion 12, it synchronises the other arms and any weight that it carries is applied to the telescopic arms 14 at a position that is ever closer to the edge of the surface on which the mounting portion 12 is mounted. As such, the turning moment caused by the weight of the item is lessened, along with the corresponding forces on the mounting portion, arms, etc. The inventors note that this unique configuration has the potential to allow for lighter and less robust materials to be used to manufacture the assembly than might otherwise be the case.

In use, an item such as a car fridge (not shown) sits on tray 16. In a storage position (e.g. FIG. 3), the car fridge sits on the tray 16, which overlies the mounting portions 12, 12 (e.g. inside the rear compartment of a four-wheel drive vehicle). A locking means such as latch 46 may be operable to prevent undesirable sliding of the tray 16 etc. with respect to the mounting portions 12, 12. When a user wants to access the car fridge, they can unlock the latch 46 (if present) and slide the fridge (and tray 16 etc.) away from the mounting portions 12, 12 such that the telescopic arms 14, 14 extend and the tray 16 moves into the position shown in FIG. 2. Once in this position, the fridge is outside of the rear compartment of the vehicle in an accessible position. If lowering the item would be helpful (e.g. in order to be able to look down on the contents of the car fridge), the linear actuator 38 and scissor arm lifting assembly 30 described above can be actuated and the tray 16 lowered from the position shown in FIG. 2 to that of FIG. 1. When it is desired to move the fridge back into the storage position, the procedure described above is simply reversed.

It will be appreciated that the present invention provides a number of new and useful advantages. For example, specific embodiments of the present invention may provide one or more of the following advantages:

the apparatus has a significantly stronger and more robust lifting assembly than conventional apparatus used for similar purposes;

the tray is significantly more stable than those of conventional apparatus, especially with respect to torsional movement;

the lifting assembly enables the use of automatically actuatable lifting and lowering mechanisms;

automatically actuated lifting assemblies do not require handles that can be difficult to accommodate;

heavier items can be carried;

lighter and/or more compact materials can be used in the apparatus; and the apparatus can be adapted to accommodate a variety of different sized items thereon:

It will be understood to persons skilled in the art of the invention that many modifications may be made without departing from the spirit and scope of the invention. All such modifications are intended to fall within the scope of the following claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that any prior art publication referred to herein does not constitute an admission that the publication forms part of the common general knowledge in the art.

The invention claimed is:

1. An apparatus for moving an item, the apparatus comprising:

a mounting portion for mounting the apparatus to a surface;

a platform configured to receive the item thereon;

extendable arms configured to extend away from the mounting portion, wherein the platform is movable between a storage position above the surface and an accessible position away from the surface;

lifting assemblies that join opposing sides of the platform to a respective extendable arm, the lifting assemblies being configured to raise and lower the platform relative to the extendable arms whilst in the accessible position; and a driver operable to raise and lower the platform, wherein at least one of the lifting assemblies comprises three arms, each arm extending between the platform and the extendable arm, at least one arm being a driven arm that is driven by the driver whereby the platform is raised or lowered, and another arm being a stabilising arm that is configured to move synchronously with the driven arm whereby the platform is stabilised, wherein an upper portion of each arm is pivotally connected to the extendable arm, and a lower end of each arm is pivotally connected to the platform, and wherein the stabilising arm and one of the other arms in the at least one of the lifting assemblies are pivotally connected intermediate their ends.

2. The apparatus of claim 1, wherein a proximal end of the stabilising arm is configured to slide along the extendable arm as the platform is raised and lowered.

3. The apparatus of claim 2, wherein the proximal end of the stabilising arm is configured to slide along the extendable arm in a direction towards the mounting portion as the platform is raised.

4. The apparatus of claim 2, wherein a distal end of the stabilising arm is pivotally fixed to the side of the platform.

5. The apparatus of claim 1, wherein two of the arms in the at least one of the lifting assemblies are driven arms that are driven by the driver.

6. The apparatus of claim 5, wherein distal ends of the driven arms are configured to slide along the side of the platform as the platform is raised and lowered.

7. The apparatus of claim 5, wherein the driver is attached to proximal ends of the driven arms.

8. The apparatus of claim 5, wherein the driven arms are pivotally fixed to the extendable arms at a pivot intermediate their proximal and distal ends.

9. The apparatus of claim 8, wherein the driven arms are curved such that their proximal ends are orientated towards the driver.

10. The apparatus of claim 9, wherein the driven arms are curved at the pivot.

11. The apparatus of claim 1, wherein the driver is a linear actuator.

12. The apparatus of claim 1, wherein the driver is electrically actuated.

13. The apparatus of claim 1, wherein the apparatus comprises two lifting assemblies that join opposing sides of the platform to respective extendable arms, each lifting assembly comprising three arms, each arm extending between the platform and the extendable arm, at least one arm being a driven arm that is driven by the driver whereby the platform is raised or lowered, and another arm being a stabilising arm that is configured to move synchronously with the driven arm whereby the platform is stabilised.

14. The apparatus claim 1, wherein the extendable arms comprise one or more telescopic arms.

15. The apparatus of claim 14, wherein the extendable arms comprise inner, intermediate and outer telescopic arms.

16. The apparatus of claim 15, wherein proximal ends of the arms of the lifting assemblies are joined to the inner telescopic arms.

17. The apparatus of claim 1, wherein the apparatus comprises two extendable arms and the platform is configured to be positioned therebetween.

18. The apparatus of claim 1, wherein a width and/or length of the platform is adjustable.

19. A kit of parts which, when assembled is the apparatus of claim 1.

* * * * *